(12) United States Patent
Berge

(10) Patent No.: US 9,936,838 B2
(45) Date of Patent: Apr. 10, 2018

(54) COUNTERTOP DEVICE HAVING RETENTION FEATURE

(71) Applicant: National Presto Industries, Inc., Eau Claire, WI (US)

(72) Inventor: Michael R. Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 0 days.

(21) Appl. No.: 15/584,530

(22) Filed: May 2, 2017

(65) Prior Publication Data

US 2017/0296002 A1 Oct. 19, 2017

Related U.S. Application Data

(62) Division of application No. 14/447,112, filed on Jul. 30, 2014, now Pat. No. 9,635,983.

(51) Int. Cl.
*A47G 21/14* (2006.01)
*A47J 47/16* (2006.01)
*F16B 2/22* (2006.01)
*F16B 47/00* (2006.01)

(52) U.S. Cl.
CPC ............... *A47J 47/16* (2013.01); *F16B 2/22* (2013.01); *F16B 47/00* (2013.01)

(58) Field of Classification Search
None
See application file for complete search history.

(56) References Cited

U.S. PATENT DOCUMENTS

| D26,777 | S | | 3/1897 | Donnelly | |
|---|---|---|---|---|---|
| 687,183 | A | | 11/1901 | Kolander | |
| 1,779,057 | A | * | 10/1930 | Tolmach | A46B 5/0075 15/144.2 |
| 2,332,504 | A | * | 10/1943 | Brenner | F16M 11/14 248/181.1 |
| 2,679,372 | A | * | 5/1954 | May | A47J 43/25 248/362 |
| 2,950,836 | A | | 8/1960 | Murdock | |
| 3,424,419 | A | | 1/1969 | Siegel | |
| 4,066,231 | A | | 1/1978 | Bahner et al. | |
| 4,093,165 | A | | 6/1978 | Sussman | |
| 4,180,229 | A | | 12/1979 | Schulien | |
| 5,094,415 | A | | 3/1992 | Revette et al. | |
| 5,148,731 | A | | 9/1992 | Boerner | |

(Continued)

OTHER PUBLICATIONS

Application and File history for U.S. Appl. No. 14/447,112, filed Jul. 30, 2014. Inventors: Berge.

*Primary Examiner* — Monica E Millner
(74) *Attorney, Agent, or Firm* — Patterson Thuente Pedersen, P.A.

(57) ABSTRACT

A countertop device and related methods of use in food preparation for rotatably coupling a kitchen utensil to an anchored retention member. The countertop device can include a kitchen utensil having a manipulation end and a retaining end. The retention member can have a retention body defining a suction cup on a mounting surface. The retention member can be anchored to a flat surface using the suction cup. A retaining ball and socket mount can be utilized to rotatably attach the kitchen utensil to the retention member. The kitchen utensil can include a manipulation member and a mounting member capable of positioning a food item there between.

3 Claims, 20 Drawing Sheets

(56) References Cited

U.S. PATENT DOCUMENTS

| | | |
|---|---|---|
| 5,474,206 A | 12/1995 | Herring, Sr. |
| 5,592,244 A | 1/1997 | Vyhrneister |
| 5,649,634 A | 7/1997 | Irizarry |
| 5,671,659 A | 9/1997 | Swindle |
| D406,018 S | 2/1999 | Zirbes |
| 6,142,432 A | 11/2000 | Amussen |
| 6,315,224 B1 | 11/2001 | Holcomb |
| 6,318,652 B1 | 11/2001 | Liu |
| 6,443,388 B1 | 9/2002 | Hollinger |
| 6,502,794 B1 | 1/2003 | Ting |
| D470,729 S | 2/2003 | Kotsonis |
| 6,619,604 B1 * | 9/2003 | Stillman ............... A47J 45/02 248/205.5 |
| 6,688,485 B1 * | 2/2004 | Lauer ................. A47G 19/02 220/574 |
| D497,293 S | 10/2004 | Cheng |
| 6,808,090 B2 | 10/2004 | Pedersen |
| 7,092,521 B2 | 8/2006 | Wang |
| 7,219,767 B1 | 5/2007 | Steinbok |
| 7,246,781 B2 | 7/2007 | Nam |
| 7,293,750 B2 | 11/2007 | Richter |
| D569,200 S | 5/2008 | Chalfant |
| 7,481,388 B2 | 1/2009 | Palese |
| 7,597,301 B2 | 10/2009 | Seil et al. |
| 7,658,354 B2 | 2/2010 | Wang |
| 7,810,777 B2 * | 10/2010 | Paradise ............. A47G 29/093 248/205.5 |
| 7,815,155 B2 | 10/2010 | Hung |
| 7,861,647 B2 | 1/2011 | So et al. |
| 8,061,746 B1 | 11/2011 | Stephens, III |
| 8,176,927 B2 * | 5/2012 | Wu ........................ A61H 3/02 135/65 |
| 8,267,361 B1 | 9/2012 | Dordick |
| 8,366,064 B2 * | 2/2013 | Chen ................... F16M 11/043 224/416 |
| D680,820 S | 4/2013 | McGuyer |
| D681,420 S * | 5/2013 | Ileuov ............................ D8/354 |
| 8,439,238 B1 | 5/2013 | Harter et al. |
| D695,579 S | 12/2013 | Kestenbaum |
| 8,602,376 B2 | 12/2013 | Vogel et al. |
| D699,523 S | 2/2014 | McGuyer et al. |
| 8,857,747 B2 | 10/2014 | Goto |
| D731,496 S * | 6/2015 | Voorhees .................... D14/447 |
| D734,746 S | 7/2015 | Vogel |
| 9,635,983 B2 | 5/2017 | Berge |
| 2003/0035693 A1 | 2/2003 | Chalfant |
| 2004/0247403 A1 | 12/2004 | Grace et al. |
| 2006/0284043 A1 | 12/2006 | Paradise et al. |
| 2008/0092717 A1 | 4/2008 | Dunlop |
| 2011/0241362 A1 | 10/2011 | Fleming |
| 2012/0175474 A1 * | 7/2012 | Barnard ............... F16M 11/041 248/122.1 |
| 2013/0334347 A1 | 12/2013 | Willis |

\* cited by examiner

COUNTERTOP DEVICE HAVING RETENTION FEATURE

RELATED APPLICATION

This application is a division of application Ser. No. 14/447,112 filed Jul. 30, 2014, which is hereby fully incorporated herein by reference.

FIELD OF THE INVENTION

The present invention is directed to kitchen utensils. More specifically, the present invention is directed to a kitchen utensil including a countertop retention feature to assist with utilization of the kitchen utensil.

BACKGROUND OF THE INVENTION

A wide variety of kitchen utensils are used every day to assist with food preparation. These can include knives for cutting or chopping, spoons for measuring and stirring, spatulas for flipping or turning, cups for measuring and a wide variety of other utensils. In some instances, utensils can be manufactured to promote the grip and handling of the utensil, for example, by using grip enhancing materials like rubber and the like or by providing an ergonomically beneficial shape.

In some instances, use of these kitchen utensils requires a user to manipulate and/or position the utensil with one hand while manipulating/positioning a food item with the other hand. Representative examples can include a cheese grater or slicer or a potato peeler. In the case of a cheese grater or peeler, a user typically holds one end of the utensil and positions a second end against a countertop surface such that a block of cheese can be moved relative to the utensil. With a potato peeler, a user is required to hold the potato with one hand while directing the peeler against that potato with the other hand. In the case of the cheese grater or peeler, the potential exists for the second end to slide against the countertop while with the potato peeler, the potential exists for the user to cut or otherwise injure themselves during the peeling process.

As such, it would be beneficial to improve upon existing kitchen utensils by improving the ability to hold and position the utensils and removing a user's hand from an area in which injury could occur.

SUMMARY OF THE INVENTION

A countertop device of the present invention can comprise a kitchen utensil that is rotatably coupled to an anchored retention member. The retention member can have a retention body defining a retention surface for gripping a mounting surface such as, for example, a kitchen counter, a table, a cutting board or an appliance surface. In one embodiment, the retention surface can define a suction cup while, alternatively, the retention surface can include a non-slip surface formed of a non-slip material such as, for example, silicone rubber. Alternatively, the retention body can define a clamp for gripping the mounting surface while in yet another embodiment, the retention body can define the mounting surface, such as, for example, a cutting board. The kitchen utensil can be rotatably coupled to the retention body through the combination of a retaining ball and socket mount. In some embodiments, the kitchen utensil can include the retaining ball and the retention member can include the socket mount. In other embodiments, the retaining ball and socket mount can be reversed with the socket mount included on the kitchen utensil and the retaining ball positioned on the retention member. In some embodiments, the kitchen utensil can include a manipulation member and a mounting member capable of positioning a food item there between such that the food item is anchored and rotatably positionable with respect to the retention member.

In one aspect, an embodiment of a countertop device can comprise a kitchen utensil that is rotatably coupled to an anchored retention member. The retention member can include a means for mounting the retention member, such as, for example, a suction cup, to a flat surface such as, for example, a countertop, a table, a cutting board, an appliance surface and the like. Alternatively, the means for mounting the retention member can include a non-slip surface formed of a non-slip material such as, for example, silicone rubber. Alternatively, the means for mounting can comprise a clamp on the anchored retention member or alternatively, the retention member can define the flat surface, such as, for example, a cutting board. The kitchen utensil can rotatably engage the retention member through a means for engaging. In some embodiments, the means for engaging can comprise a retaining ball on the kitchen utensil and a socket mount on the retention member. In another embodiment, the means for engaging can be reversed with the socket mount being located on the kitchen utensil and the retaining ball being incorporated into the retention member. In some embodiments, the kitchen utensil can comprise a manipulation member and a mounting member, wherein a food item is capable of being captured between the manipulation member and the mounting member such that the food item is rotatably positionable relative to the retention member.

In another aspect of the present invention, a method of preparing food can comprise anchoring a retention member to an anchoring surface with a means for mounting. In some embodiments, the means for mounting can comprise a suction cup. Alternatively, the means for mounting can include a non-slip surface formed of a non-slip material such as, for example, silicone rubber. In other alternative embodiments, the means for mounting can define a clamp for gripping the anchoring surface while in yet another embodiment, the retention body can define the anchoring surface, such as, for example, a cutting board. The method can further comprise coupling a kitchen utensil to the retention member with a means for engaging. In some embodiments, the means for engaging can comprise a retaining ball and socket mount that allows the kitchen utensil to be rotatably positioned relative to the retention member. In some embodiments, the step of coupling the kitchen utensil to the retention member can comprise inserting a retaining ball on the kitchen utensil into a socket mount on the retention member. Alternatively, the step of coupling the kitchen utensil to the retention member can comprise placing a socket mount on the kitchen utensil over a retaining ball on the retention member. In some embodiments, the kitchen utensil can comprise a manipulation member and a mounting member and the method can further comprise capturing a food item between the manipulation member and the mounting member wherein attachment of the mounting member to the retention members allows the food item to be rotatably positionable with respect to the retention member.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be more completely understood in consideration of the following detailed description of various embodiments of the invention in connection with the accompanying drawings, in which.

Figure 1:
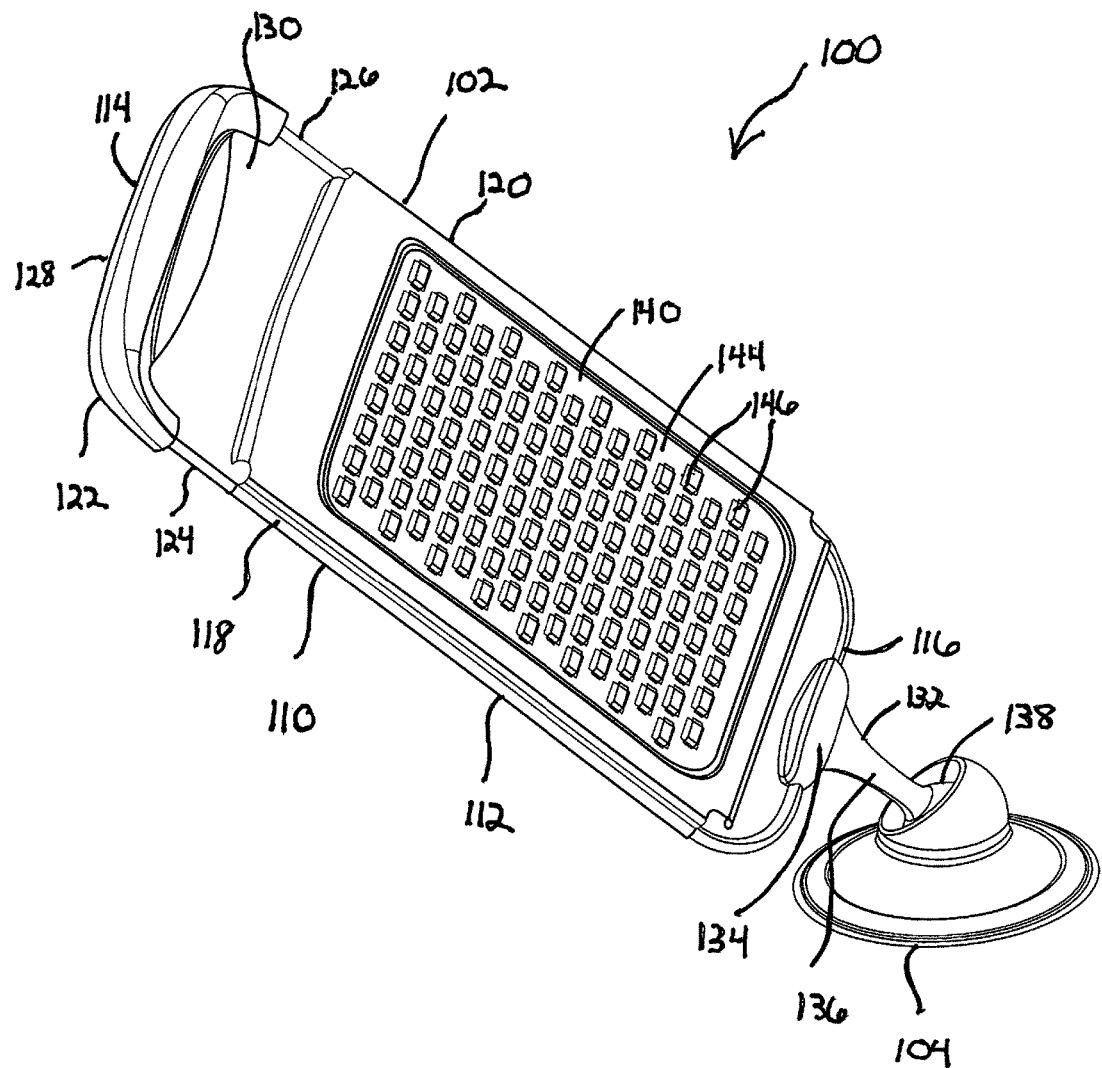
FIG. 1 is a perspective, front view of a countertop device according to a representative embodiment of the present invention.
Figure 2:
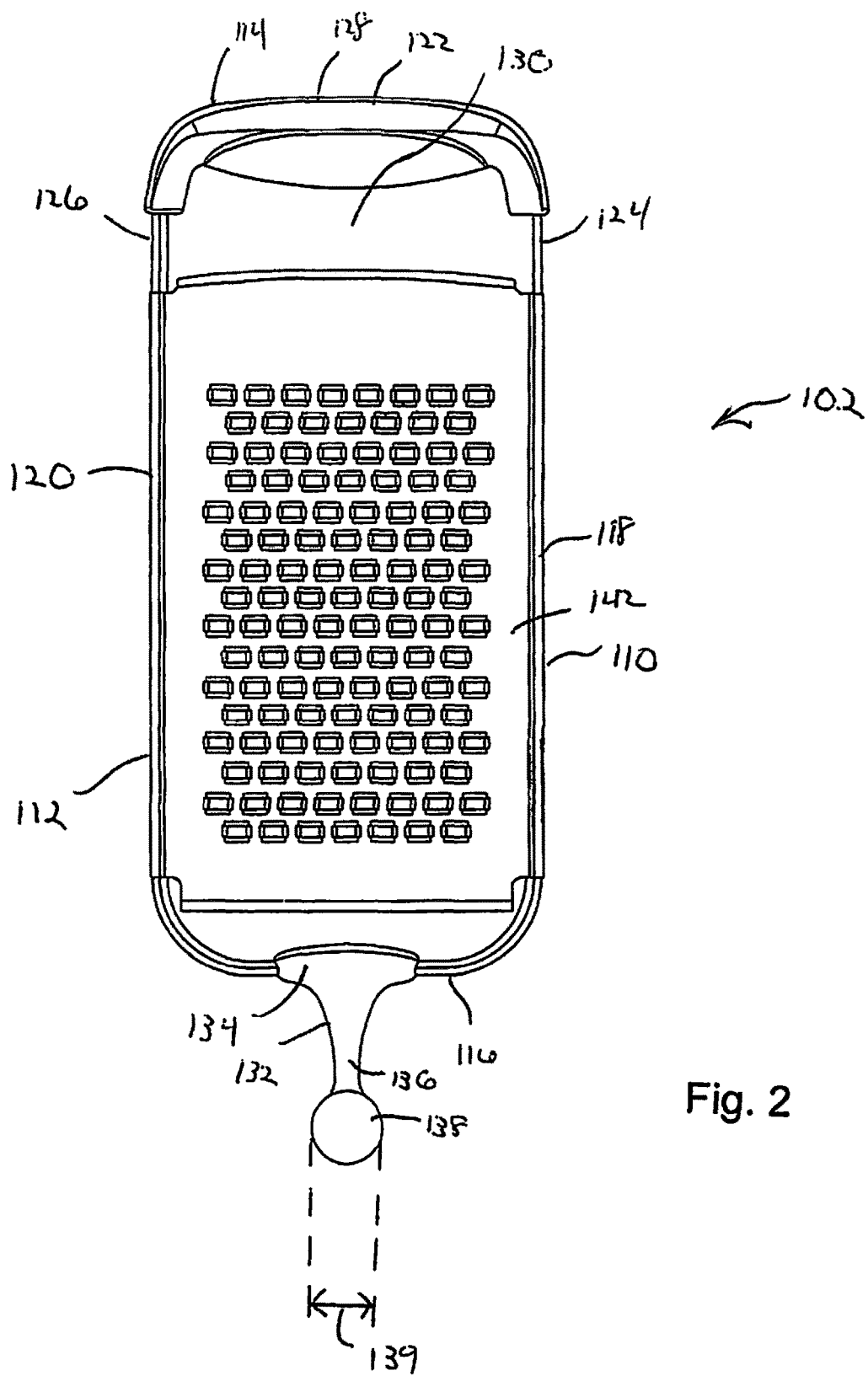
FIG. 2 is a rear view of a kitchen utensil according to a representative embodiment of the present invention.
Figure 3:
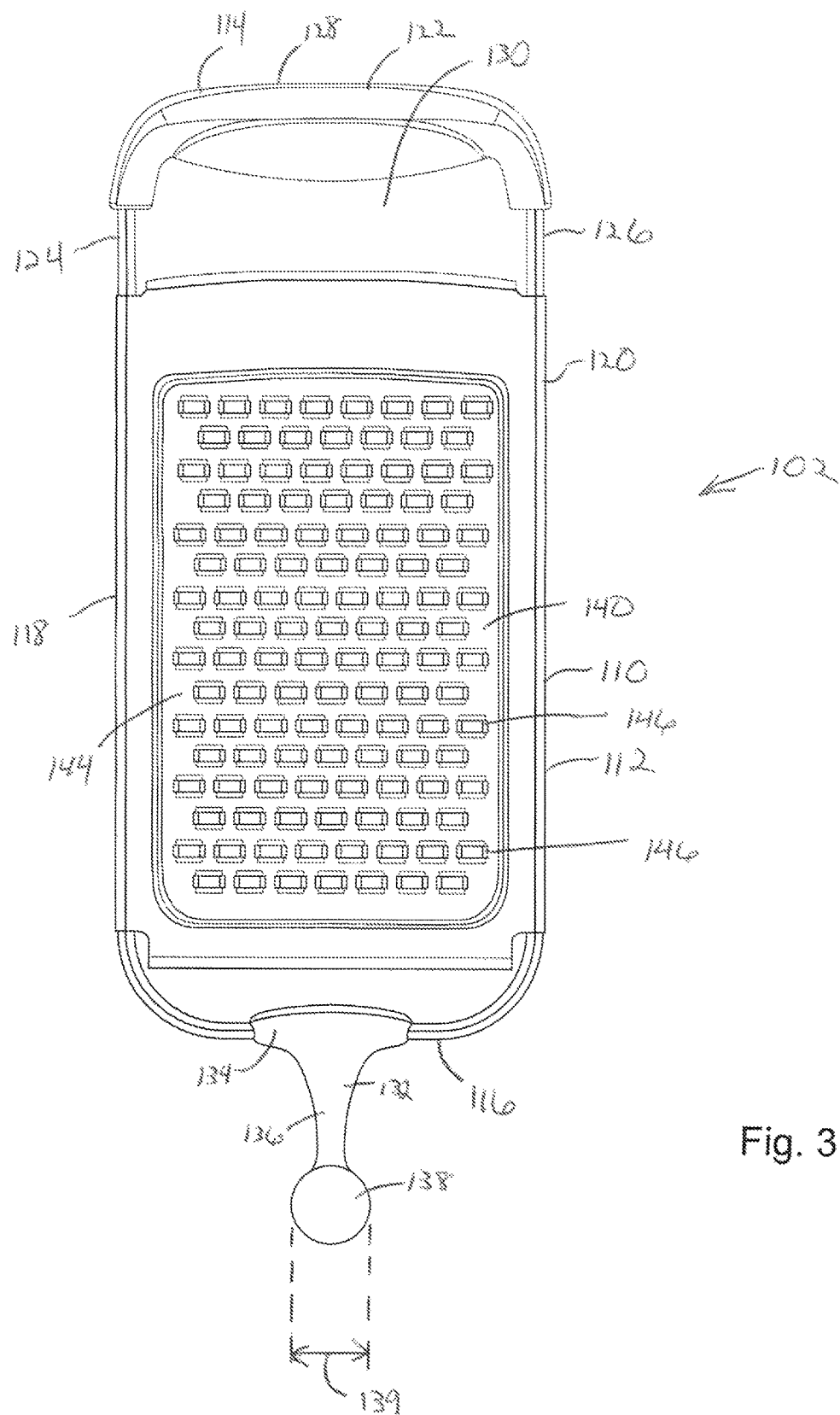
FIG. 3 is a front view of the kitchen utensil of FIG. 2.
Figure 4:
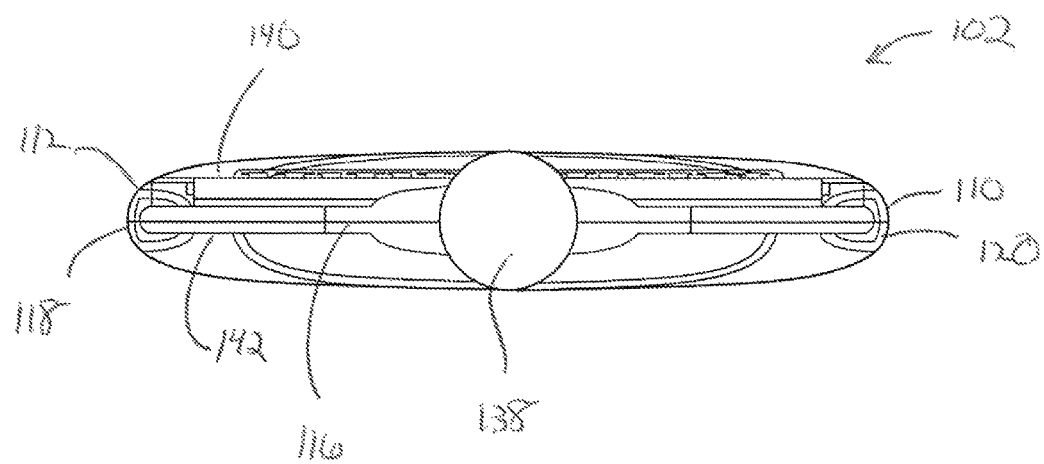
FIG. 4 is a bottom view of the kitchen utensil of FIG. 2.
Figure 5:
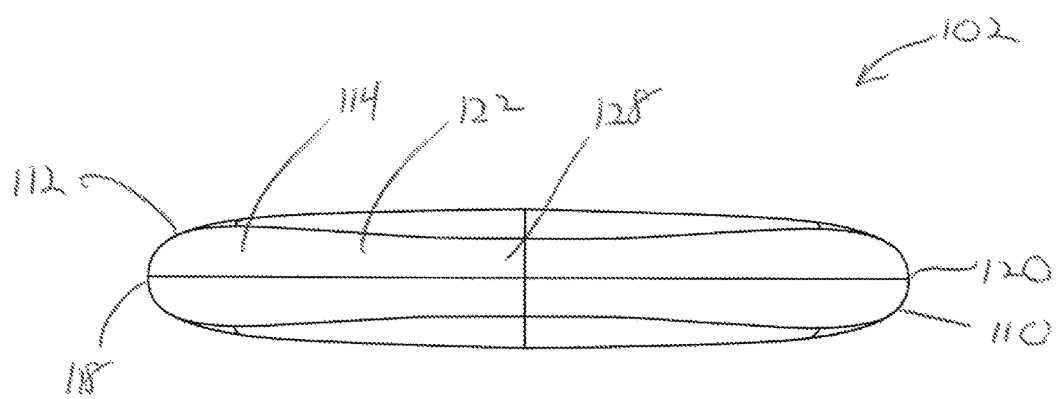
FIG. 5 is a top view of the kitchen utensil of FIG. 2.
Figure 6:
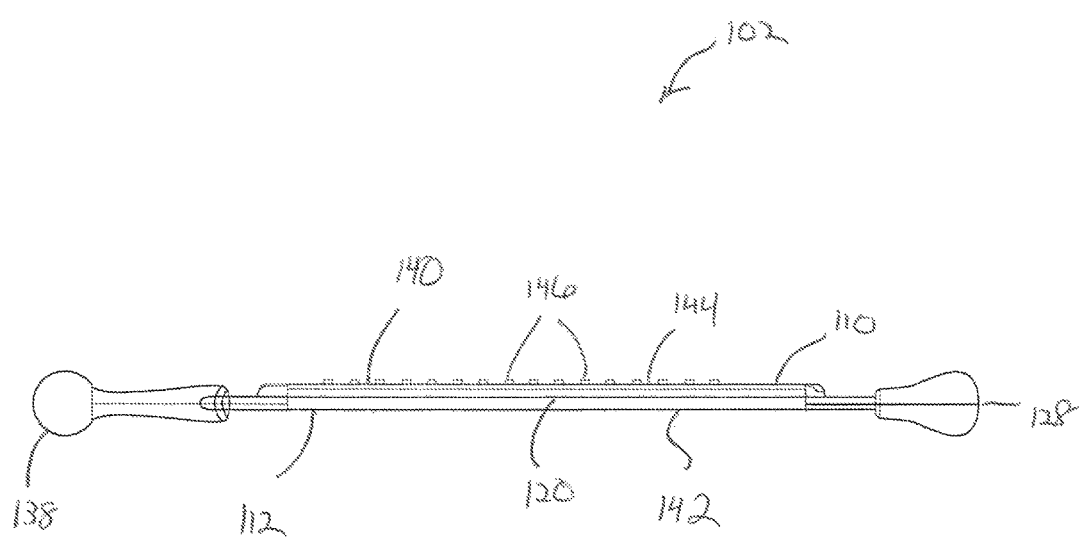
FIG. 6 is a right side view of the kitchen utensil of FIG. 2.
Figure 7:
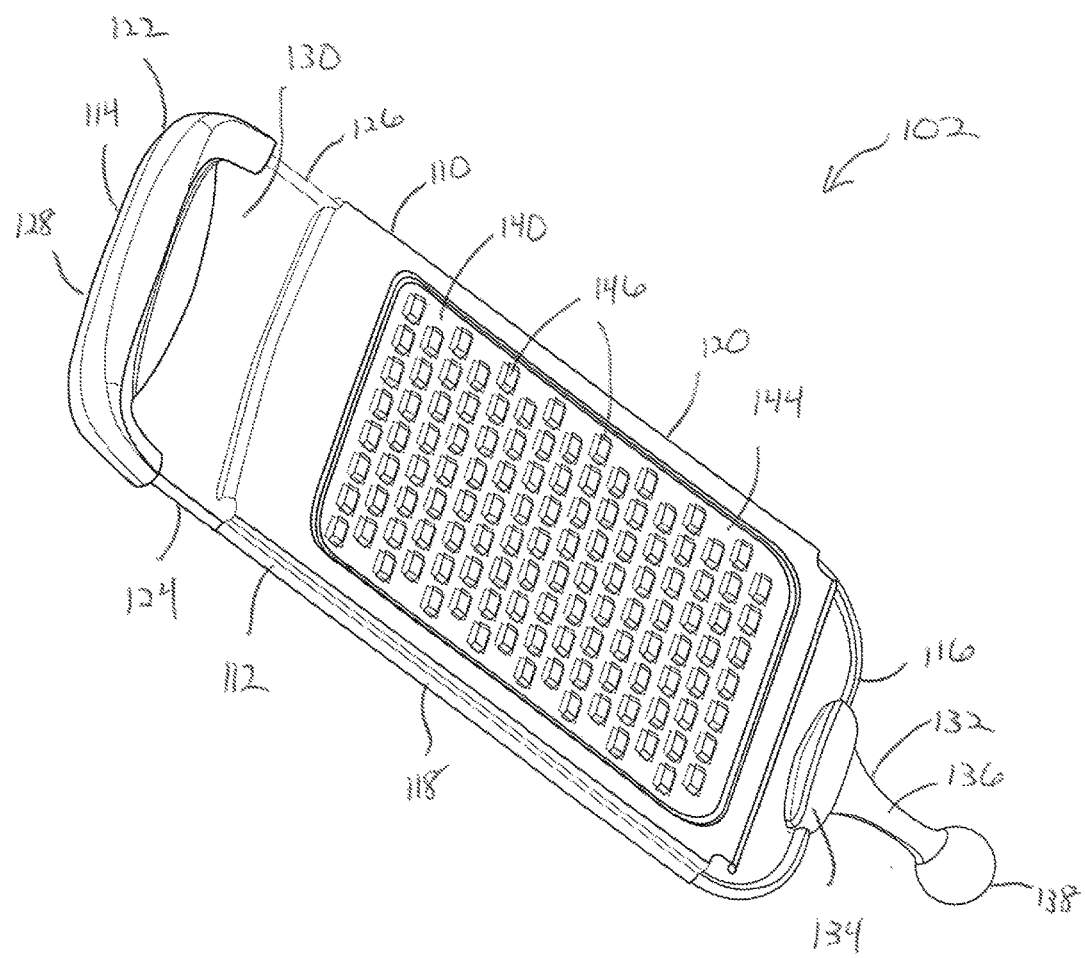
FIG. 7 is a perspective, front view of the kitchen utensil of FIG. 2.
Figure 8:
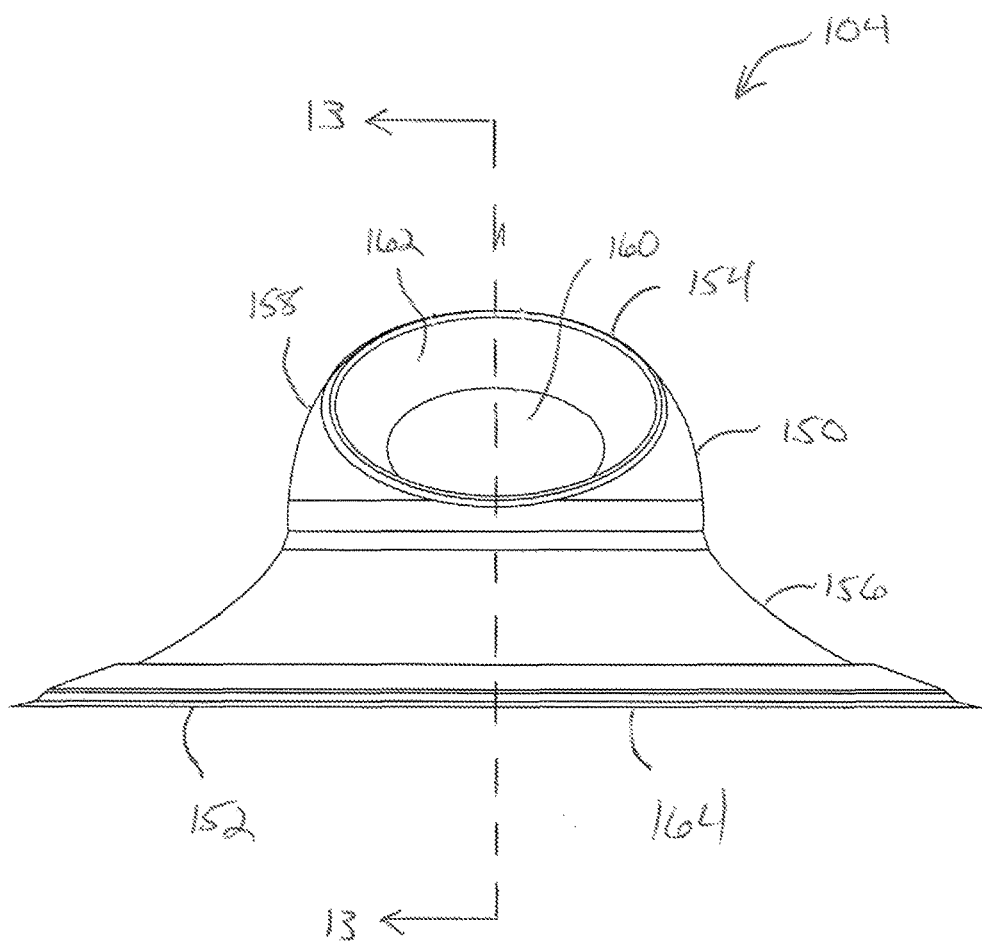
FIG. 8 is a front view of a retention member according to a representative embodiment of the present invention.
Figure 9:
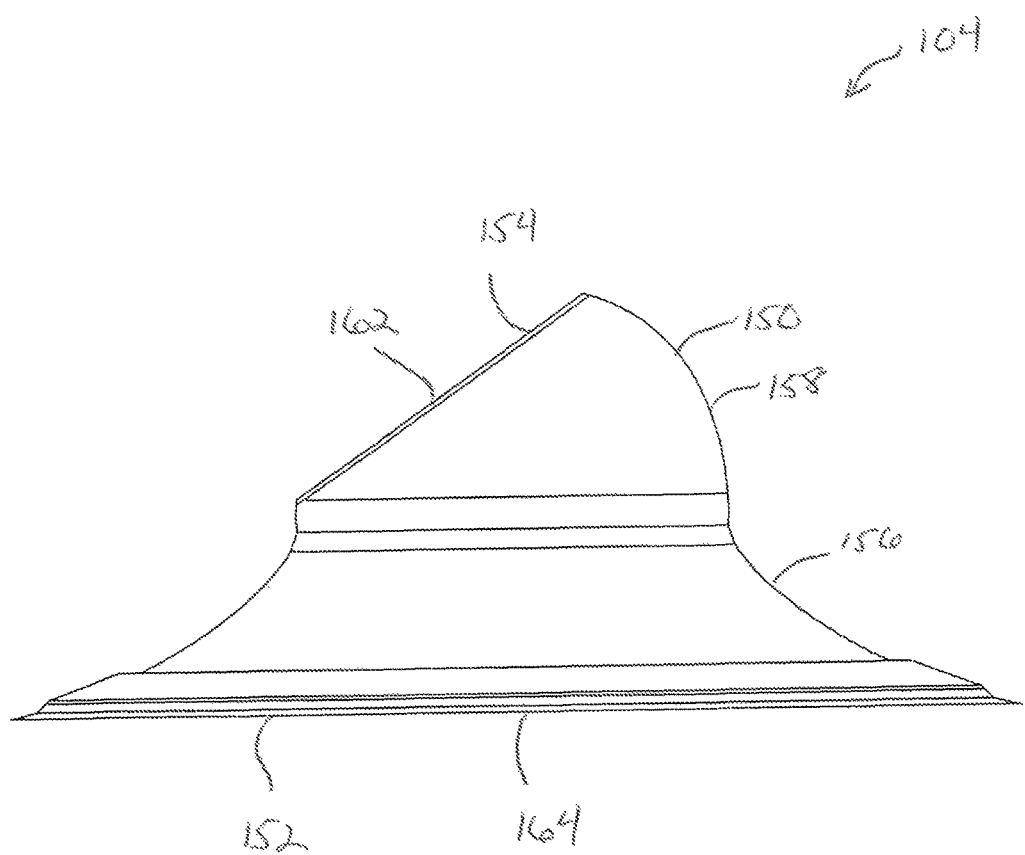
FIG. 9 is a left side view of the retention member of FIG. 8.
Figure 10:
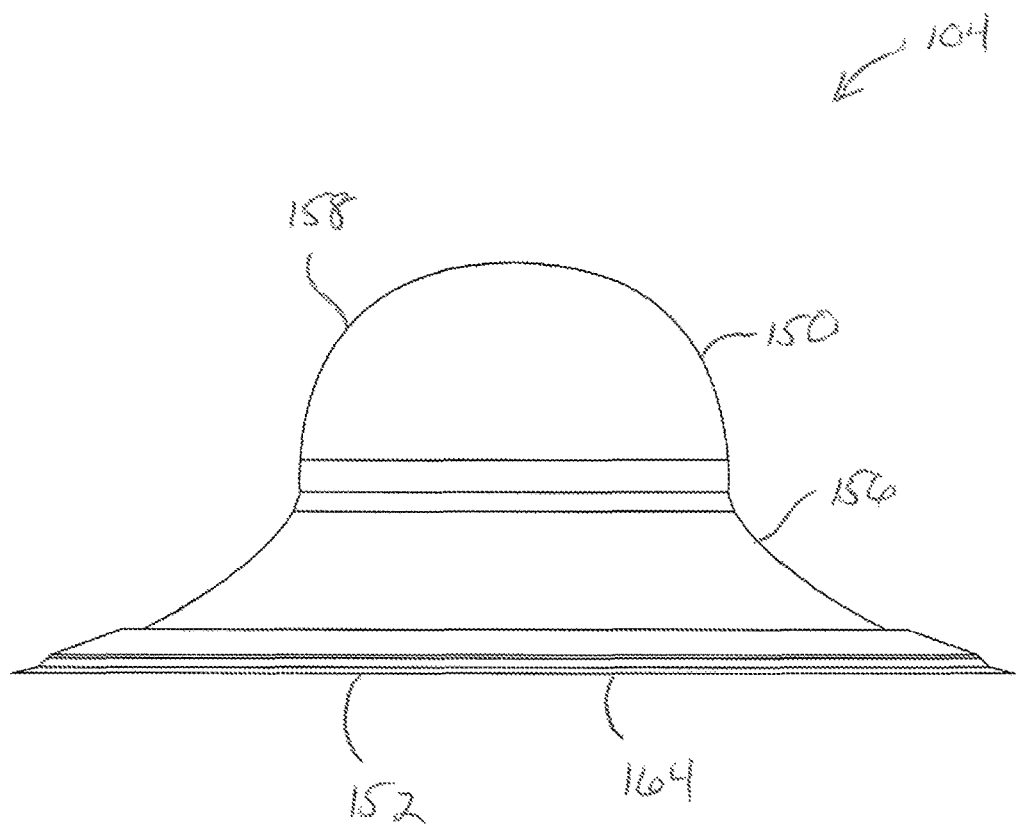
FIG. 10 is a rear view of the retention member of FIG. 8.
Figure 11:
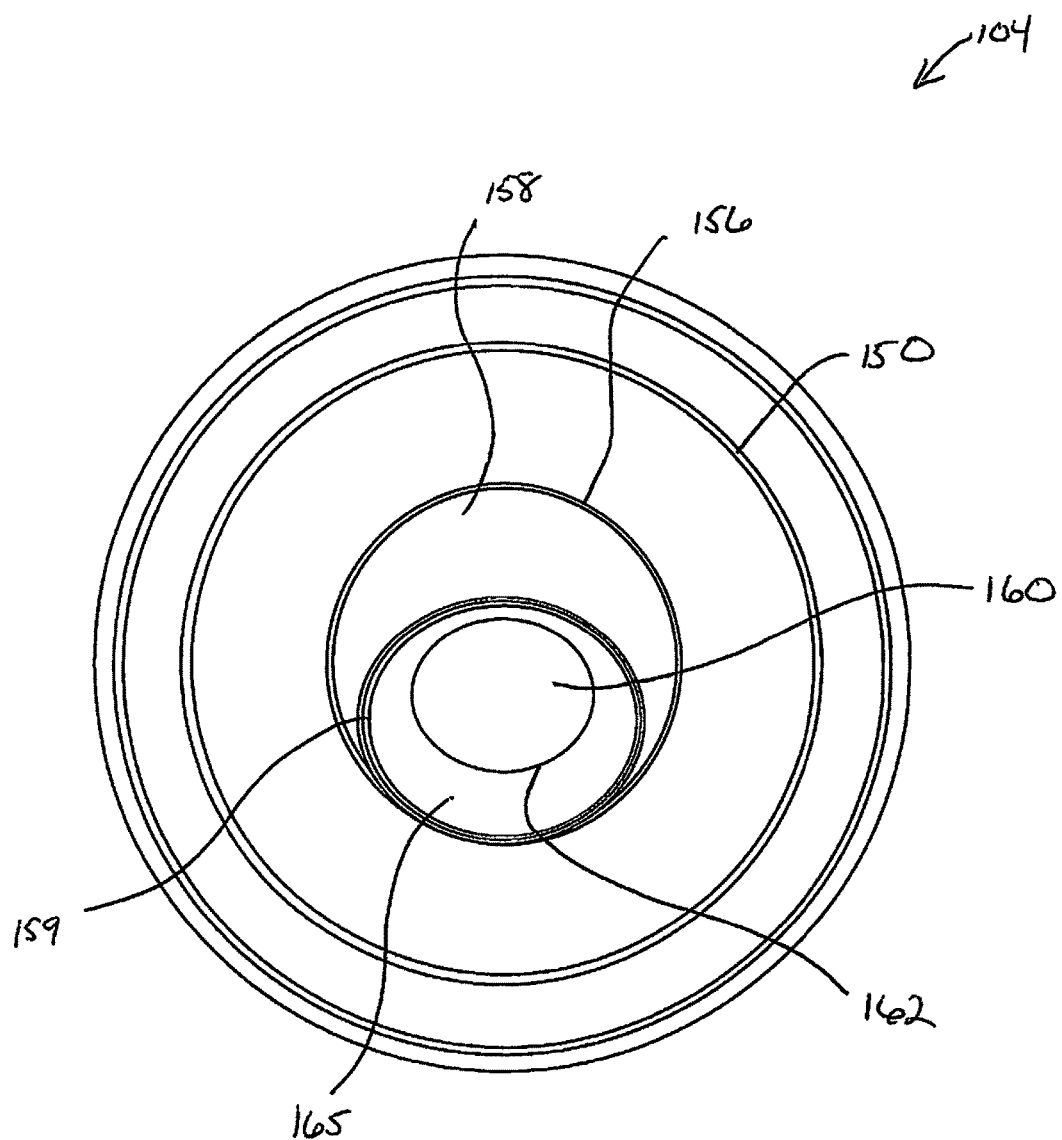
FIG. 11 is a top view of the retention member of FIG. 8.
Figure 12:
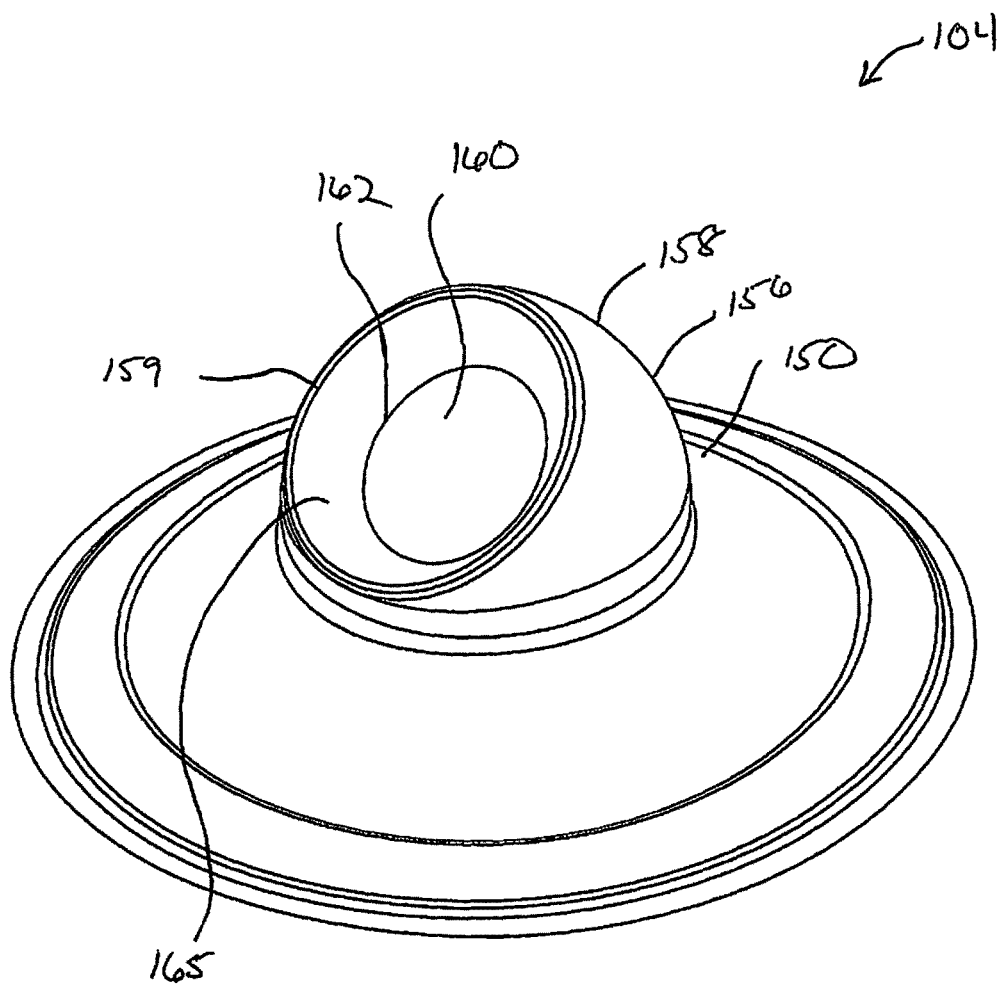
FIG. 12 is a perspective view of the retention member of FIG. 8.
Figure 13:
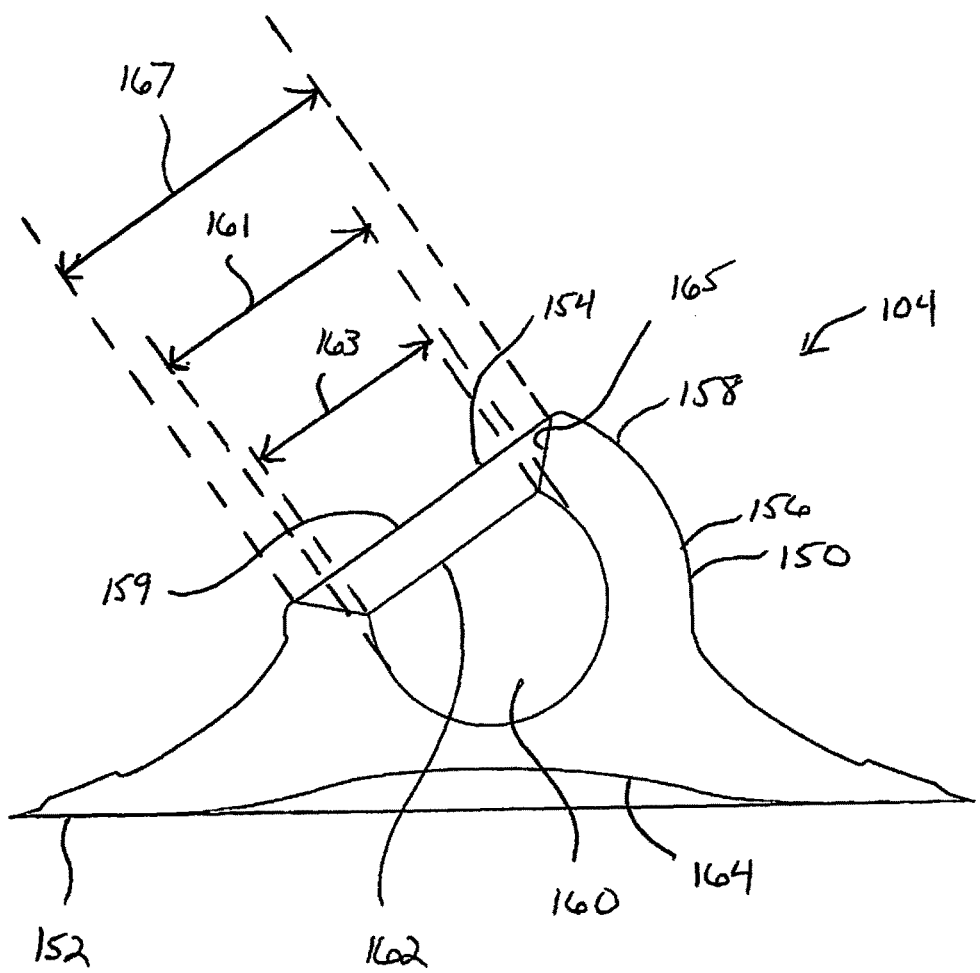
FIG. 13 is a section view of the retention member of FIG. 8 taken at line 13-13 of FIG. 8.

While the invention is amenable to various modifications and alternative forms, specifics thereof have been shown by way of example in the drawings and will be described in detail. It should be understood, however, that the intention is not to limit the invention to the particular embodiments as described. On the contrary, the intention is to cover all modifications, equivalents, and alternatives falling within the spirit and scope of the invention as defined by the appended claims.

DETAILED DESCRIPTION OF THE DRAWINGS

A countertop device 100 of the present invention is illustrated in FIG. 1. Countertop device 100 generally comprises a kitchen utensil 102 and a retention member 104 as will be described in further detail below. Generally, countertop device 100 can be fabricated of materials suitable for contact with food and that are capable of being cleaned and sanitized through hand washing or using a conventional dishwasher. Representative materials can include, for example, metals such as, for example, aluminum and stainless steel and polymers such as, for example, nylon and silicone.

As illustrated in FIGS. 1-7, kitchen utensil 102 can comprise a cheese grater 110. Cheese grater 110 can comprise a utensil body 112 having a grasping end 114, a retaining end 116 and sides 118, 120. Grasping end 114 can define a handle 122. As illustrated, handle 122 can include a pair of handle extensions 124, 126 and a grasping surface 128. Handle extensions 124, 126 generally space the grasping surface 128 away from the utensil body 112 such that a handle space 130 is defined between the grasping surface 128 and the utensil body 112. Retaining end 116 generally include a retaining member 132 defined by a connecting end 134, a retaining arm 136 and a retaining ball 138. Retaining ball 138 has a ball diameter 139. Utensil body 112 further includes a front surface 140 and a rear surface 142. Front surface 140 generally defines a grating surface 144 formed with a plurality of grating slots 146.

Referring to FIGS. 8-13, retention member 104 generally comprises a retention body 150 including a mounting surface 152 and a socket mount 154. As illustrated in FIGS. 8-13, retention body 150 can include an exterior surface 156 having a rounded perimeter 158. Alternatively, the exterior surface 156 can be configured to have a variety of alternative shapes and appearances. Socket mount 154 generally defines a circular cavity 160 having an exterior circular opening 159 and an interior circular opening 162, wherein the external circular opening 159 and the interior circular opening 162 are connected by an angled opening surface 165. Circular cavity 160 has a cavity diameter 161 that is slightly larger than an interior opening diameter 163 of the circular opening 162, while the external circular opening 159 has an external opening diameter 167 that is larger than both the cavity diameter 161 and the interior opening diameter 163. Mounting surface 152 can comprise a mean for mounting the retention body to a flat or anchoring surface. In one preferred embodiment, the means for mounting can comprise a suction cup 164 defined on the mounting surface 152. Alternatively, the mounting surface can comprise a non-slip surface formed of a non-slip material such as, for example, silicone rubber. Alternatively, the retention body can define a clamp for gripping the flat or anchoring surface while in yet another embodiment, the retention body can define the flat or anchoring surface, such as, for example, a cutting board.

In use, a user positions the retention member 104 such that the mounting surface 152 is on a flat surface such as, for example, a countertop or table. The user presses down on the retention body 150 whereby a means for mounting the retention body, for example, the suction cup 164 is caused to engage and be retained against the flat surface. With the retention member 104 retainably positioned on the flat surface, the user can utilize a means for engaging the kitchen utensil 102 and the retention member 104, for example, by directing the retaining ball 138 toward the socket mount 154. The user forces the retaining ball 138 into the interior circular opening 162 by directing the retaining ball 138 through the exterior circular opening 159 and past the angled opening surface 165. The ball diameter 139 and cavity diameter 161 are essentially equal such that the retaining ball 138 essentially pops past the interior circular opening 162 and into the circular cavity 160 whereby the retaining ball 138 is retained within the circular cavity 160. The retaining ball 138 is then free to rotate within the circular cavity 160. By grasping the handle 122, the user is able to position the utensil body 112 at an angle that is beneficial for using the cheese grater 110. Generally, the user can grasp a block of cheese and position the cheese against the grating surface 144 wherein directing the cheese along the grating surface 144 from the grasping end 114 toward the retaining end 116 results in the cheese being grated by the grating slots 146. The grated cheese emerges from the grating slots 146 on the rear surface 142, whereby the grated cheese can be collected for use.

Figure 14:
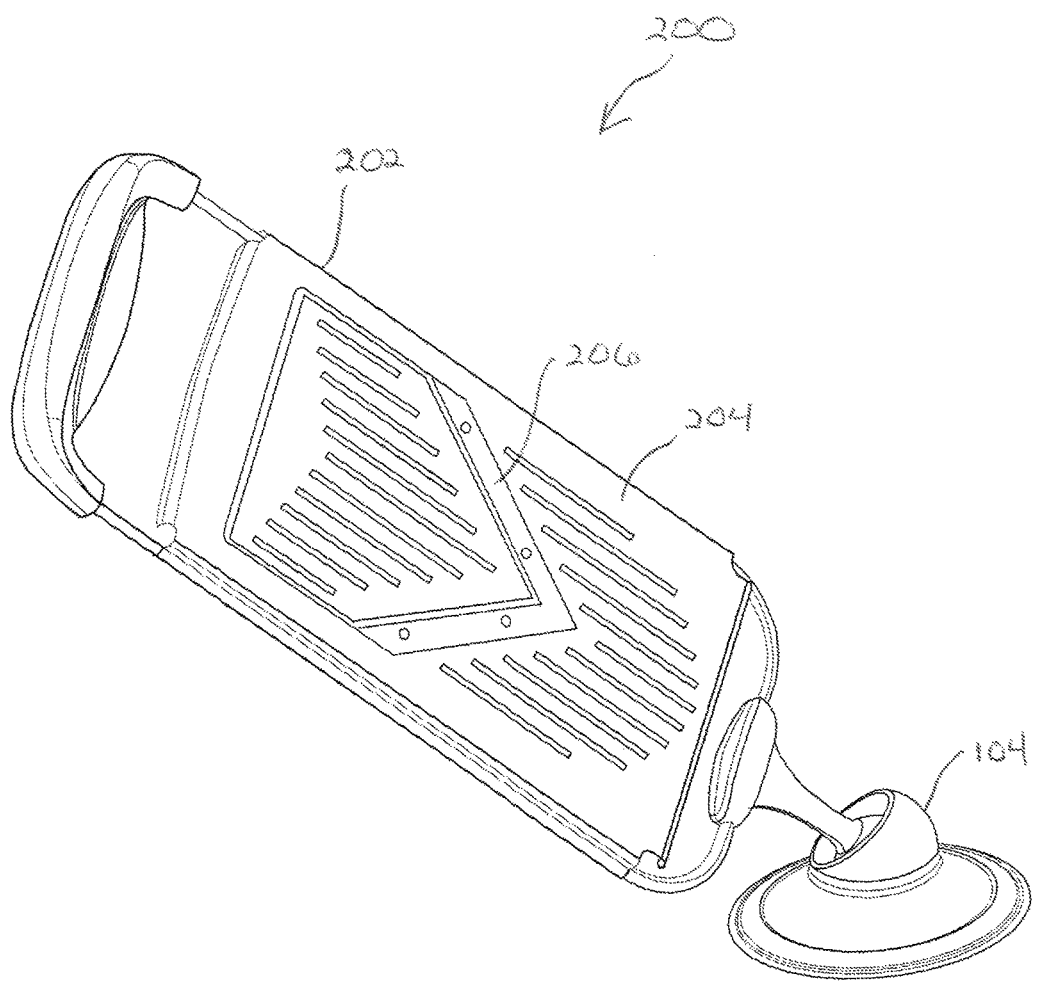
FIG. 14 is a perspective, front view of a countertop device according to a representative embodiment of the present invention.
Figure 15:
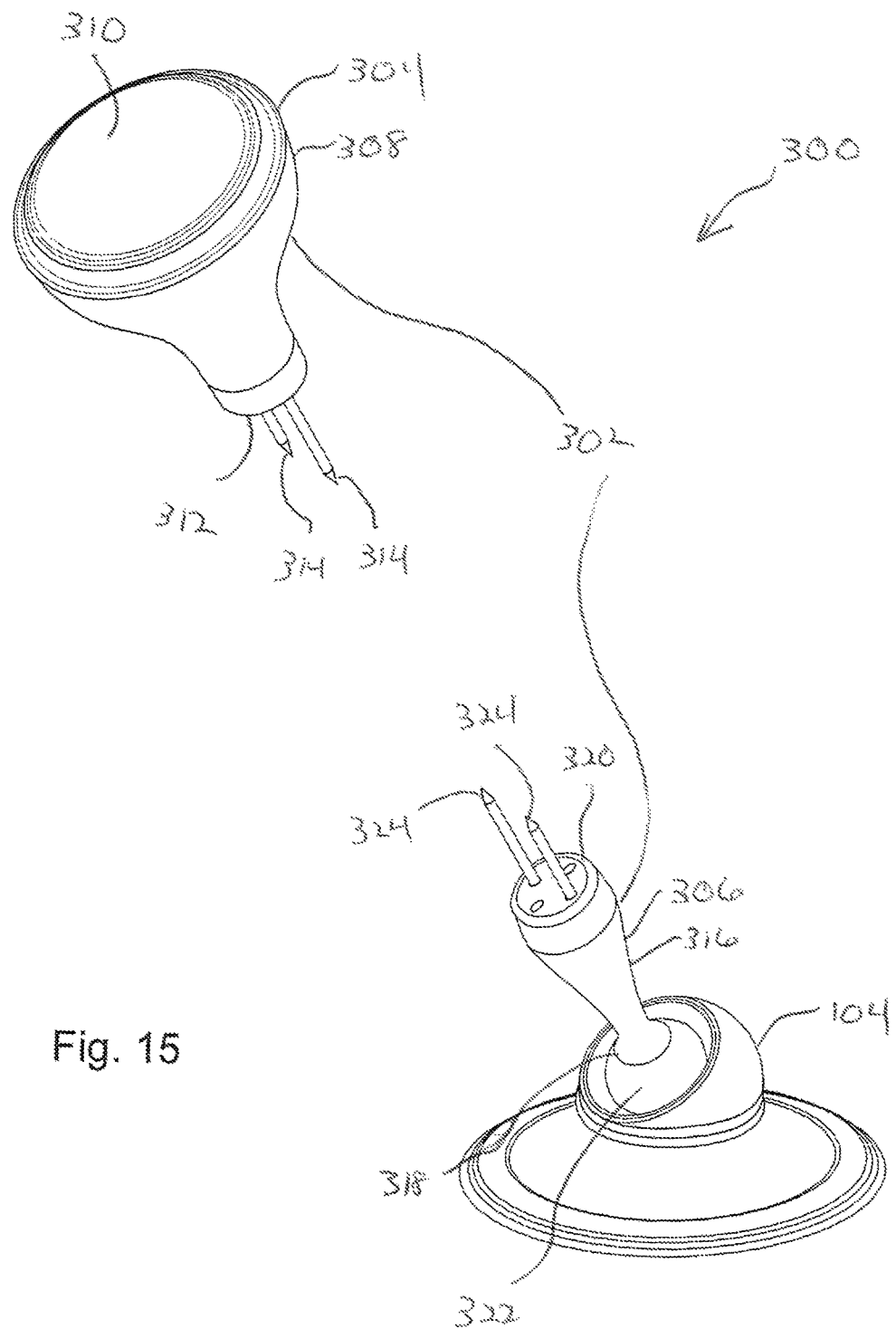
FIG. 15 is a perspective, front view of a countertop device according to a representative embodiment of the present invention.
Figure 16:
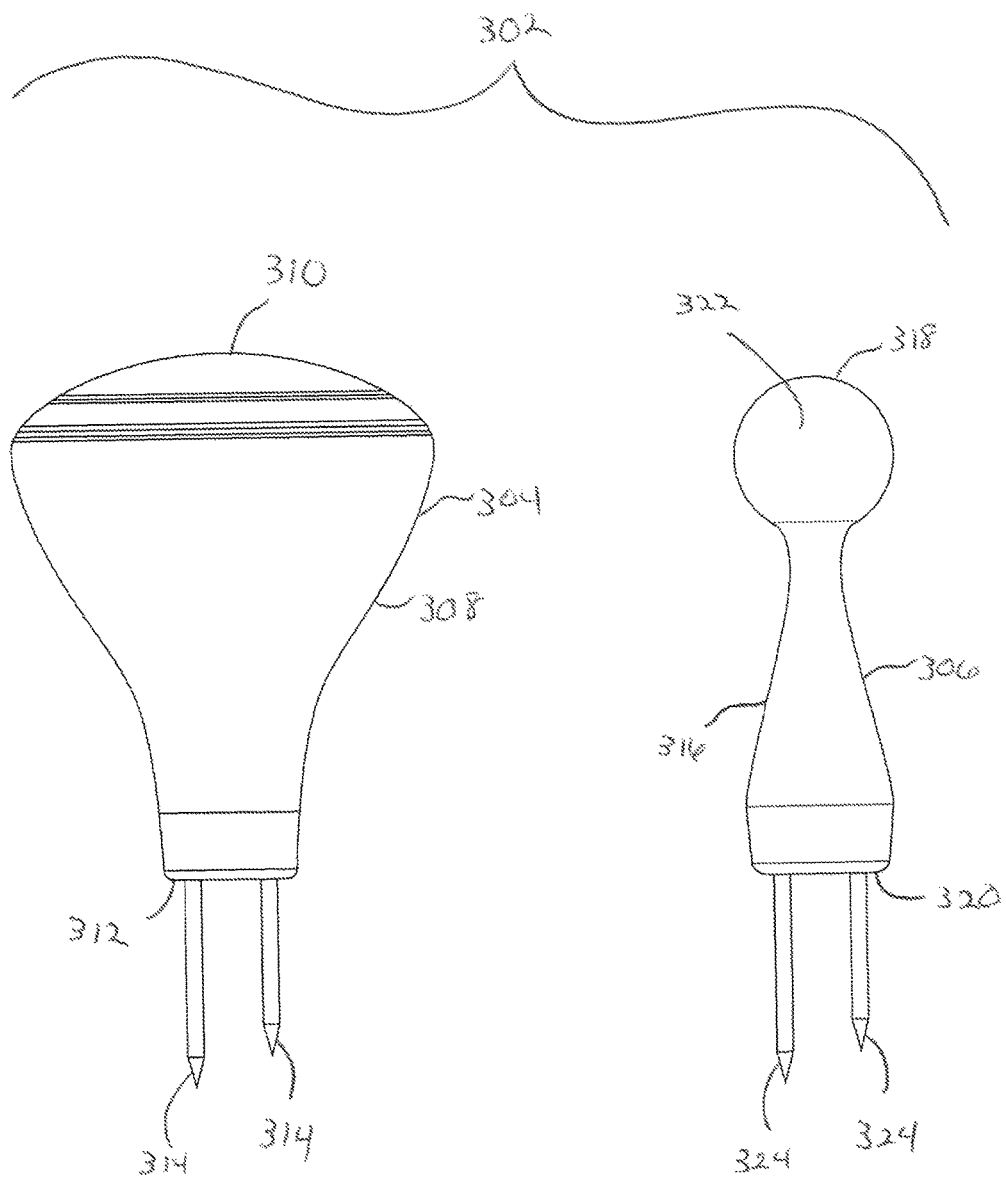
FIG. 16 is a front view of a kitchen utensil according to a representative embodiment of the present invention.
Figure 17:
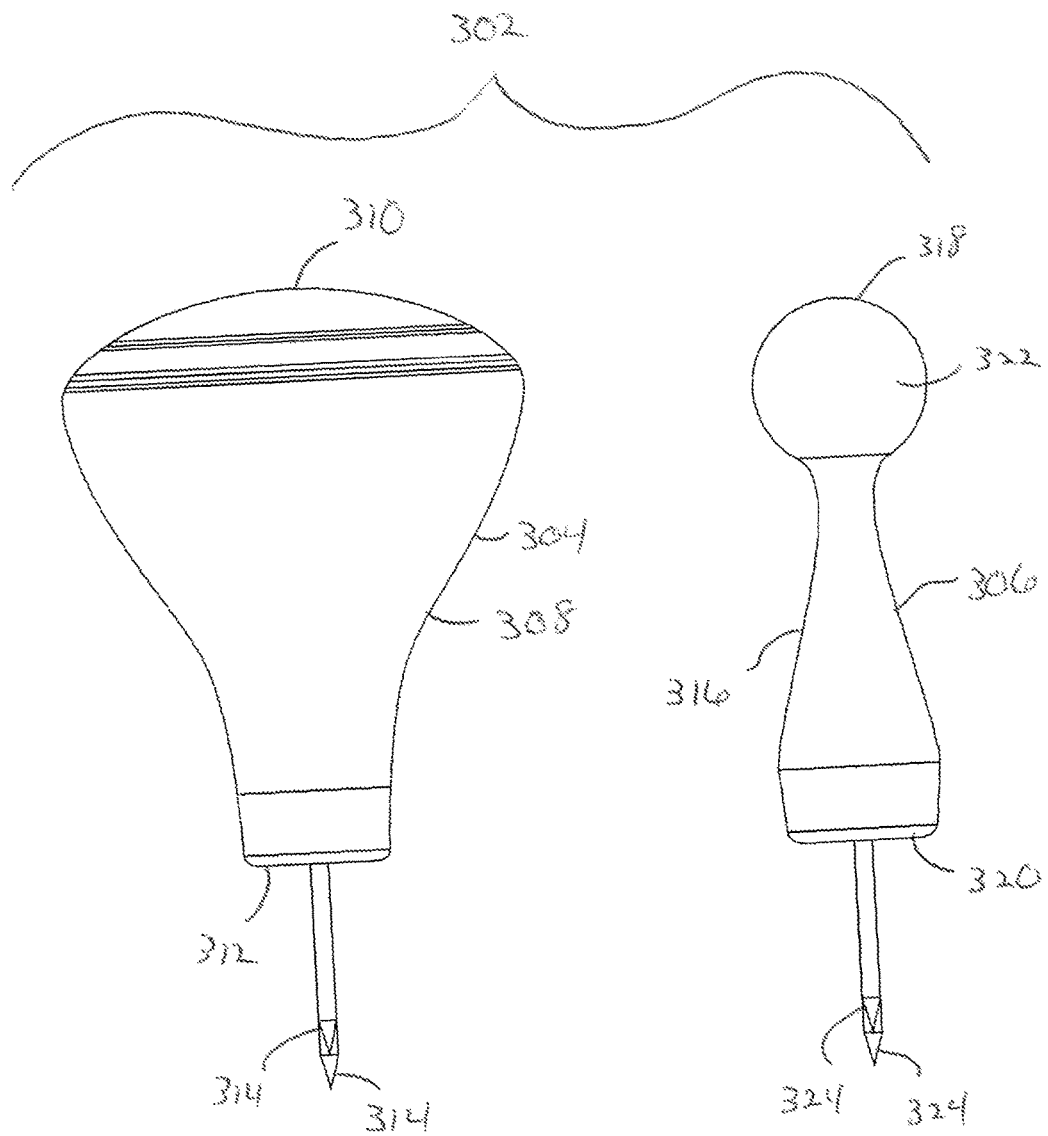
FIG. 17 is a side view of the kitchen utensil of FIG. 16.
Figure 18:
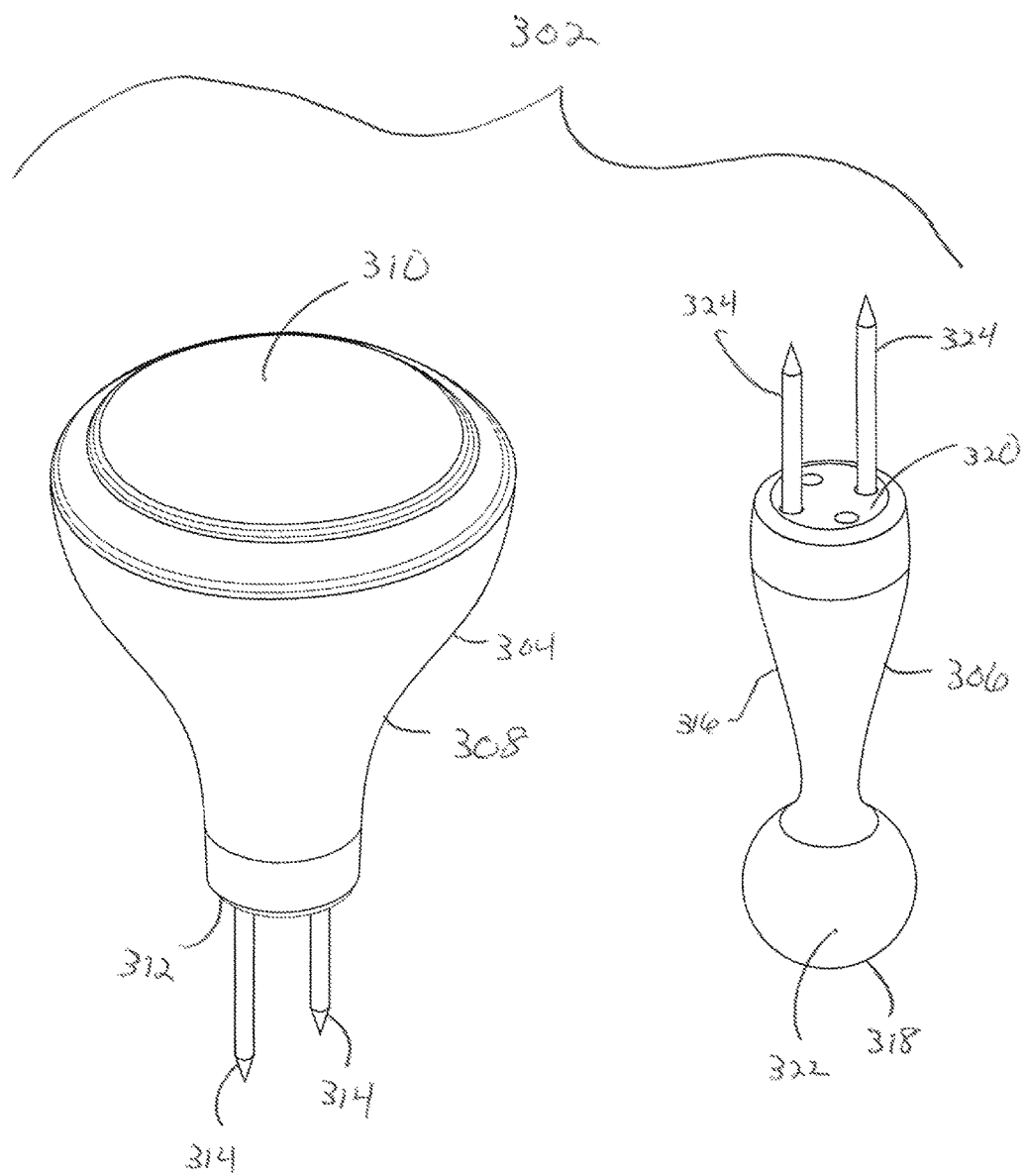
FIG. 18 is a perspective, top view of the kitchen utensil of FIG. 16.

As illustrated in FIG. 14, another representative embodiment of a countertop device 200 of the present invention can substantially resemble countertop device 100 but with modification to the kitchen utensil 102. For example, a kitchen utensil 202 can be substantially identical to kitchen utensil 102 but with front surface 140 generally defining a slicing surface 204 including a slicing slot 206. Kitchen utensil 202 can be similarly attached to and retained within the retention member 104 as previously described with respect to countertop device 100 wherein something to be sliced, such as, for example, a block of cheese is positioned against the slicing surface 204 such that directing the cheese along the slicing surface 204 from the grasping end 114 toward the retaining end 116 results in the cheese being sliced by the slicing slot 206. The sliced cheese emerges from the slicing slot 206 on the rear surface 142, whereby the sliced cheese can be collected for use.

Referring to FIGS. 15-19, another representative embodiment of a countertop device 300 of the present invention can comprise a utensil assembly 302 and retention member 104. Utensil assembly 302 can comprise a manipulation member 304 and a mounting member 306. Manipulation member 304 can comprise a manipulation body 308 having a first manipulation end 310 and a second manipulation end 312. Second manipulation end 312 can include one or more piercing elements 314. Mounting member 306 can comprise a mounting body 316 having a first mounting end 318 and a second mounting end 320. First mounting end 318 can comprise a retaining ball 322 that substantially resembles retaining ball 138 in both size and shape. Second mounting end 320 can include one or more piercing elements 324.

Figure 19:
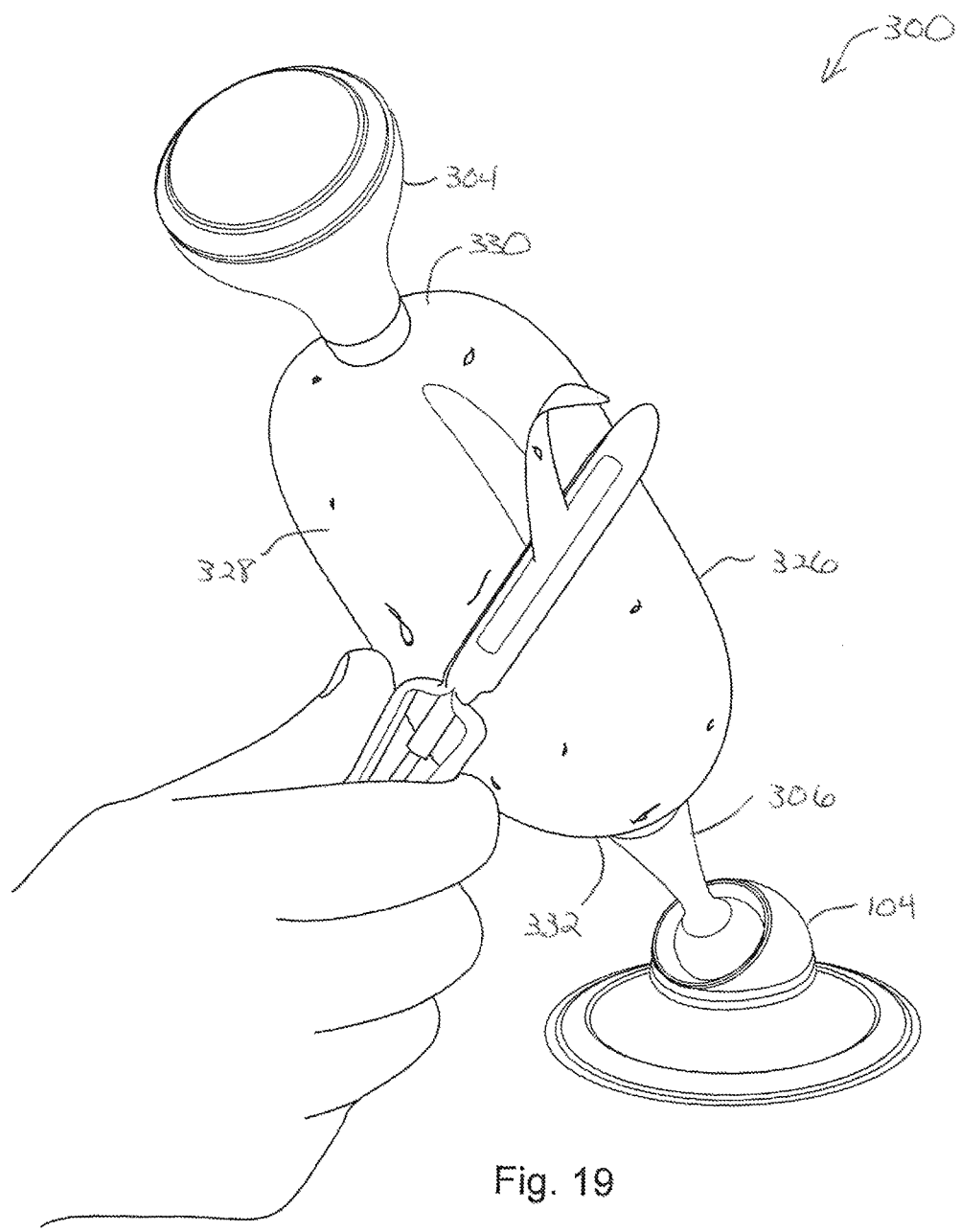
FIG. 19 is a perspective, front view of the countertop device of FIG. 15 illustrating use of the countertop device.

In use, manipulation member 304 and mounting member 306 can be positioned with respect to a food item 326 such as, for example, a potato 328 as shown in FIG. 19 or an ear of corn or other suitable food item. Generally, a user grasps the manipulation body 308 and directs the piercing elements 314 into a first end 330 of food item 326. The user can then grasp the retaining body 316 and direct the piercing elements 324 into a second end 332 of the food item 326. With the utensil assembly 302 coupled to the food item 326, the user can direct the retaining ball 322 into the circular opening 162 such that the retaining ball 322 pops into and is retained within the circular cavity 160. The user can then grasp the manipulation body 308 and pivot and angle the food item 326 to ease peeling as in the case with potato 328, or for example, buttering or removing corn kernels with a knife in the case of an ear of corn.

Figure 20:
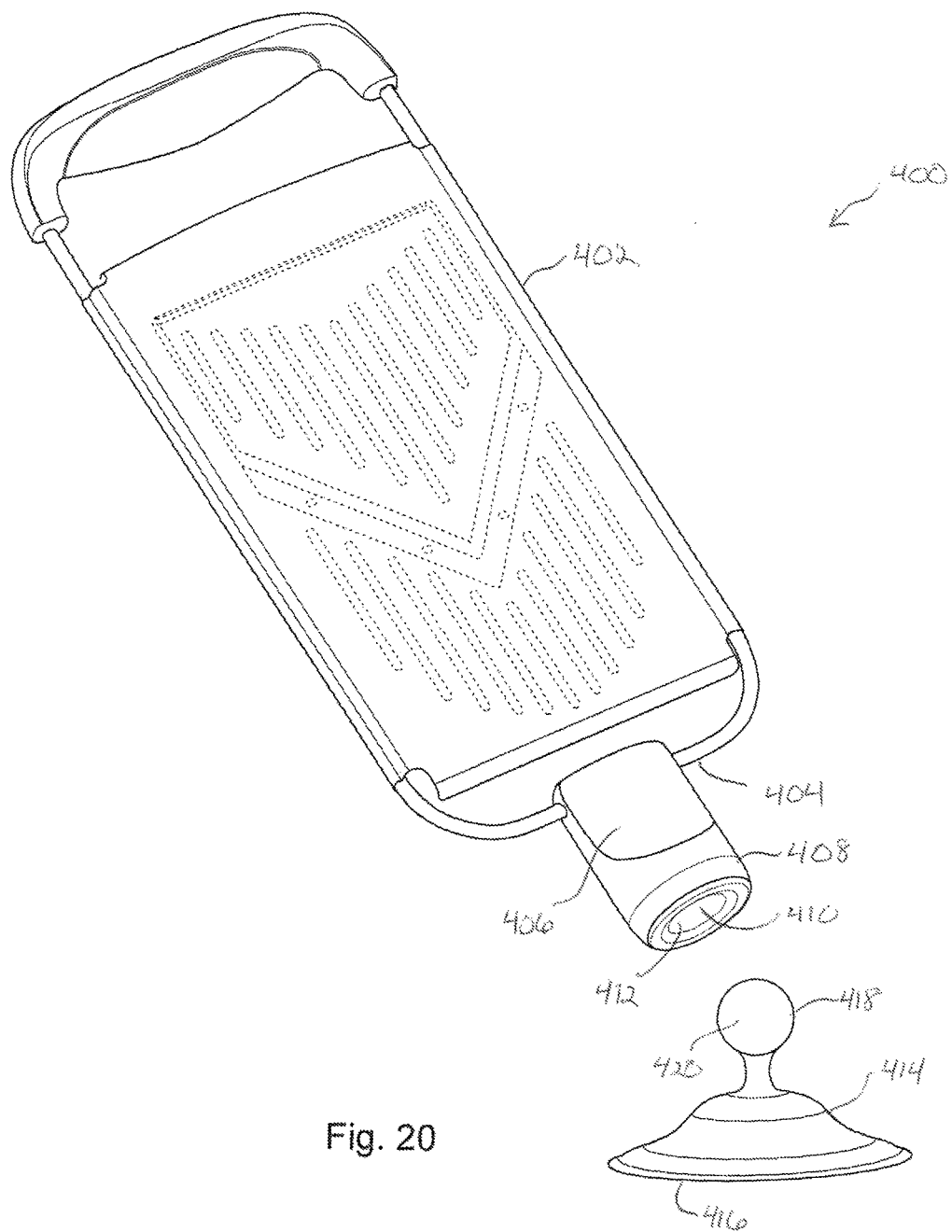
FIG. 20 is a perspective, front view of a countertop device according to a representative embodiment of the present invention.

As illustrated in FIG. 20, another representative embodiment of a countertop device 400 of the present invention can substantially resemble countertop device 200 but with modification to the kitchen utensil 202 and retention member 104. For example, countertop device 400 can comprise essentially a reverse version of the ball and socket mount such that a kitchen utensil 402 includes a retaining end 404 defining a retaining body 406. Retaining body 406 can define a socket mount 408 defining a circular cavity 410 having a circular opening 412. In addition, countertop device 400 can further comprise a retention member 414 including a mounting surface 416 and a retaining member 418 defining a retaining ball 420. The dimensions and sizing of the circular cavity 410, circular opening 412 and retaining ball 420 can be similar to those previously described with respect to circular cavity 160, circular opening 162 and retaining ball 138. Kitchen utensil 402 can be operably coupled to the retention member 414 by pressing or otherwise inserting the retaining ball 420 past the circular opening 412 and into the circular cavity 410. In this way, the retaining ball 420 is retained within the circular cavity 410 while allowing a user to rotatably position the kitchen utensil 402 relative to the retention member 414.

As described in the present application, various kitchen utensils including cheese graters, cheese slicers and peeling devices can be incorporated into various embodiments of the invention. In addition, it will be understood that the invention can be utilized as a holder for various kitchen utensils including, for example, whisks, spatulas, spoons, tongs and the like. In addition, the invention can function as a holder for recipe cards, smart phones or as a table computer stand.

Although specific examples have been illustrated and described herein, it will be appreciated by those of ordinary skill in the art that the present application is intended to cover adaptations or variations thereof of the presently disclosed invention. Therefore, it will be understood that the scope of the present invention is defined by the attached claims and their legal equivalents.

The invention claimed is:

1. A method for preparing food with a kitchen utensil, comprising:
   anchoring a retention member to an anchoring surface, the retention member including a retention body having a mounting surface for engaging the anchoring surface and a retaining ball; and
   coupling a kitchen utensil to the retention member, the kitchen utensil including a socket mount that engages with the retention ball, the socket mount defining a circular cavity, the circular cavity including an opening, said opening being defined by an external opening connected to an interior opening with an angled opening surface therebetween, the circular cavity having a cavity diameter, the external opening having an external opening diameter and the interior opening having an interior opening diameter, wherein the cavity diameter is larger than the interior opening diameter and the external opening diameter is larger than the cavity diameter, and wherein the retaining ball has a ball diameter essentially equal to the cavity diameter, wherein the retaining ball is inserted through the external opening and past the angled opening surface such that the retaining ball is forced through the interior opening diameter and into the circular cavity such that the kitchen utensil is rotatable positionable relative to the retention member.

2. A countertop device, comprising:
   a kitchen utensil having a socket mount defining a circular cavity, the circular cavity including an opening having an external opening connected to an interior opening with an angled opening surface therebetween, the circular cavity having a cavity diameter, the external opening having an external opening diameter and the interior opening having an interior opening diameter, wherein the cavity diameter is larger than the interior opening diameter and the external opening diameter is larger than the cavity diameter; and
   a retention member including a means for mounting the retention member to a flat surface, the retention member including a retaining ball wherein the retaining ball has a ball diameter essentially equal to the cavity diameter, wherein the retaining ball is inserted through the external opening and past the angled opening surface such that the retaining ball is forced though the interior opening diameter and into the circular cavity for coupling and retaining the kitchen utensil to the retention member such that the kitchen utensil is rotatably positionable relative to the retention member.

3. The countertop device of claim 2, wherein the kitchen utensil is selected from the group consisting essentially of: a grater or a slicer.

* * * * *

UNITED STATES PATENT AND TRADEMARK OFFICE
CERTIFICATE OF CORRECTION

PATENT NO.         : 9,936,838 B2
APPLICATION NO.    : 15/584530
DATED              : April 10, 2018
INVENTOR(S)        : Berge Page 1 of 1

It is certified that error appears in the above-identified patent and that said Letters Patent is hereby corrected as shown below:

In the Claims

Column 6, Line 51, delete "rotatable" and insert --rotatably--

Signed and Sealed this
Twenty-second Day of May, 2018

Andrei Iancu
*Director of the United States Patent and Trademark Office*